(12) United States Patent
Dingal

(10) Patent No.: US 11,250,350 B2
(45) Date of Patent: Feb. 15, 2022

(54) MEASUREMENT APPARATUS

(71) Applicant: Rohde & Schwarz GmbH & Co. KG, Munich (DE)

(72) Inventor: Roland Dingal, Singapore (SG)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 225 days.

(21) Appl. No.: 16/528,245

(22) Filed: Jul. 31, 2019

(65) Prior Publication Data

US 2021/0035016 A1    Feb. 4, 2021

(51) Int. Cl.
*G06N 20/00*    (2019.01)
*G01D 9/00*    (2006.01)
*G01D 21/02*    (2006.01)

(52) U.S. Cl.
CPC .............. *G06N 20/00* (2019.01); *G01D 9/00* (2013.01); *G01D 21/02* (2013.01)

(58) Field of Classification Search
CPC ........... G06N 20/00; G01D 9/00; G01D 21/02
See application file for complete search history.

(56) References Cited

U.S. PATENT DOCUMENTS

| | | | |
|---|---|---|---|
| 7,411,480 B2 | 8/2008 | Ando et al. | |
| 8,018,398 B1 | 9/2011 | Harris | |
| 8,036,760 B2 * | 10/2011 | Mehta | G05B 23/0272 700/29 |
| 8,775,332 B1 * | 7/2014 | Morris | G06N 5/02 706/11 |
| 9,445,764 B2 | 9/2016 | Gross et al. | |
| 10,916,240 B2 * | 2/2021 | Lee | G10L 15/16 |
| 2004/0156067 A1 | 8/2004 | Hori et al. | |
| 2006/0129261 A1 | 6/2006 | Morita et al. | |
| 2007/0176778 A1 | 8/2007 | Ando et al. | |
| 2010/0138026 A1 * | 6/2010 | Kaushal | G06N 20/00 700/104 |
| 2012/0116194 A1 | 5/2012 | Gross et al. | |
| 2013/0262013 A1 * | 10/2013 | Ide | G06F 17/18 702/104 |
| 2014/0247146 A1 * | 9/2014 | Proud | G16H 40/67 340/870.02 |
| 2014/0247155 A1 * | 9/2014 | Proud | A61B 5/1118 340/870.16 |

(Continued)

FOREIGN PATENT DOCUMENTS

| | | |
|---|---|---|
| CN | 1520144 A | 8/2004 |
| CN | 104359200 B | 3/2017 |

(Continued)

*Primary Examiner* — Raymond L Nimox
(74) *Attorney, Agent, or Firm* — Judson K. Champlin; Westman, Champlin & Koehler, P.A.

(57) ABSTRACT

A measurement apparatus comprising at least one device interface adapted to connect an auxiliary measurement device and/or a device under test, DUT, to said measurement apparatus; a user interface adapted to input by a user settings for performing a measurement by said measurement apparatus and an artificial intelligence, AI, module adapted to provide current settings of said measurement apparatus, wherein said artificial intelligence, AI, module is machine learned on the basis of connected devices and/or settings during historic measurements performed by said measurement apparatus.

16 Claims, 4 Drawing Sheets

(56) References Cited

U.S. PATENT DOCUMENTS

| | | | |
|---|---|---|---|
| 2017/0070625 A1 | 3/2017 | Yee et al. | |
| 2017/0305437 A1* | 10/2017 | Onorato | G07C 5/08 |
| 2019/0086988 A1* | 3/2019 | He | H04W 52/0225 |
| 2019/0339686 A1* | 11/2019 | Celia | G05B 23/0286 |
| 2019/0342444 A1 | 11/2019 | Urrutia Daglio et al. | |

FOREIGN PATENT DOCUMENTS

| | | |
|---|---|---|
| CN | 107133010 A | 9/2017 |
| CN | 104090713 B | 10/2017 |
| JP | H11266263 A | 9/1999 |
| JP | 2002290848 A | 10/2002 |
| JP | 2009152962 A | 7/2009 |
| KR | 101782893 B1 | 9/2017 |
| WO | 2005098776 A1 | 10/2005 |
| WO | 2011007271 A1 | 1/2011 |
| WO | 2018120169 A1 | 7/2018 |

\* cited by examiner

MEASUREMENT APPARATUS

TECHNICAL FIELD

The invention relates to a method and system for performing an automatic configuration or reconfiguration of a measurement apparatus, in particular of a handheld test and measurement device using artificial intelligence.

TECHNICAL BACKGROUND

Measurement devices are used by technicians and operated mostly by repeating certain measurements multiple of times or by using standardized measurement settings (e.g. so-called wizard sets). These measurement settings simplify measurements by automating, standardizing and optimizing test sequences. After a measurement sequence has been configured by an expert, it can be transferred to measurement instruments in the field. An operator working in the field only needs to start the wizard set, select a measurement sequence and follow predefined instructions. A technician uses most of the time the same wizard sets in order to run tests or diagnostics on a wide range of devices under test DUTs. However, the effort to input the same settings in multiple tests is quite big even when just using wizard sets, especially when the input of the settings has to be repeated for multiple devices under test DUTs. The repetitive use of certain measurement modes requires a higher effort for inputting settings or wizard sets. This increases significantly the time required for performing measurements in the field.

Accordingly, there is a need to provide a method and apparatus which increases the efficiency for performing measurements and reduces the required measurement time.

SUMMARY OF THE INVENTION

The invention provides according to a first aspect of the present invention a measurement apparatus comprising
- at least one device interface adapted to connect an auxiliary measurement device and/or a device under test to said measurement apparatus,
- a user interface adapted to input by a user settings for performing a measurement by said measurement apparatus and an artificial intelligence module adapted to provide current settings of said measurement apparatus, wherein said artificial intelligence module is machine learned on the basis of connected devices and/or settings during historic measurements performed by said measurement apparatus.

In a possible embodiment of the measurement apparatus according to the first aspect of the present invention, a measurement usage history including connected devices and/or settings of measurements performed by said measurement apparatus is recorded over time in a memory.

In a possible embodiment of the measurement apparatus according to the first aspect of the present invention, the measurement usage history of the measurement apparatus is recorded in a local memory of said measurement apparatus and/or in a remote database connectable to said measurement apparatus.

In a further possible embodiment of the measurement apparatus according to the first aspect of the present invention, the settings input by the user via the user interface comprise measurement parameter settings and/or measurement mode settings.

In a further possible embodiment of the measurement apparatus according to the first aspect of the present invention, the machine learned artificial intelligence module of the measurement apparatus comprises an artificial neural network.

In a further possible embodiment of the measurement apparatus according to the first aspect of the present invention, the auxiliary measurement device connected to the measurement apparatus comprises a localization device.

In a further possible embodiment of the measurement apparatus according to the first aspect of the present invention, the machine learned artificial intelligence module provides the current settings to control measurement functions of said measurement apparatus automatically when the measurement apparatus is switched on or is booted up.

In a further possible embodiment of the measurement apparatus according to the first aspect of the present invention, the machine learned artificial intelligence module is adapted to prompt the user via the user interface of said measurement apparatus about available software options to perform the current measurement by said measurement apparatus.

In a further possible embodiment of the measurement apparatus according to the first aspect of the present invention, the artificial intelligence module is machine learned on the basis of its recorded measurement usage history in a separate machine learning process.

In a further possible embodiment of the measurement apparatus according to the first aspect of the present invention, the measurement apparatus comprises a user identification module adapted to identify a user on the basis of the measurement usage history and/or on the basis of a user identification input into the user interface of said measurement apparatus or by biometric user identification means of said measurement apparatus.

In a further possible embodiment of the measurement apparatus according to the first aspect of the present invention, the artificial intelligence module is learned on the basis of the measurement usage history and/or a recorded behaviour of the identified user.

In a further possible embodiment of the measurement apparatus according to the first aspect of the present invention, the measurement apparatus comprises a mobile handheld measurement apparatus for performing measurements in the field in an outdoor environment.

In a further possible embodiment of the measurement apparatus according to the first aspect of the present invention, the measurement apparatus comprises a stationary measurement apparatus for performing measurements in an indoor environment.

The invention further provides according to a further aspect a measurement system comprising
- at least one measurement apparatus having
  - at least one device interface adapted to connect an auxiliary measurement device and/or a device under test to said measurement apparatus,
  - a user interface adapted to input by a user settings for performing a measurement by said measurement apparatus and an artificial intelligence module adapted to provide current settings of said measurement apparatus, wherein said artificial intelligence module of said measurement apparatus is machine learned on the basis of connected devices and/or settings during historic measurements performed by said measurement apparatus,
- wherein said measurement system further comprises a database adapted to store the measurement usage history of the measurement apparatus.

The invention further provides according to a further aspect a method for performing a configuration of a measurement apparatus comprising the steps of:

recording a measurement usage history of said measurement apparatus, machine learning an artificial intelligence module of said measurement apparatus on the basis of the measurement usage history of said measurement apparatus and generating automatically settings of said measurement apparatus by said machine learned artificial intelligence module when the measurement apparatus is activated.

In a possible embodiment of the method according to the third aspect of the present invention, the measurement usage history including devices connected to said measurement apparatus and settings of measurements performed by said measurement apparatus is recorded in a local memory of said measurement apparatus and/or in a remote database connectable to the measurement apparatus.

BRIEF DESCRIPTION OF FIGURES

In the following, possible embodiments of the different aspects are described in more detail with reference to the enclosed figures.

DETAILED DESCRIPTION OF EMBODIMENTS

Figure 1:
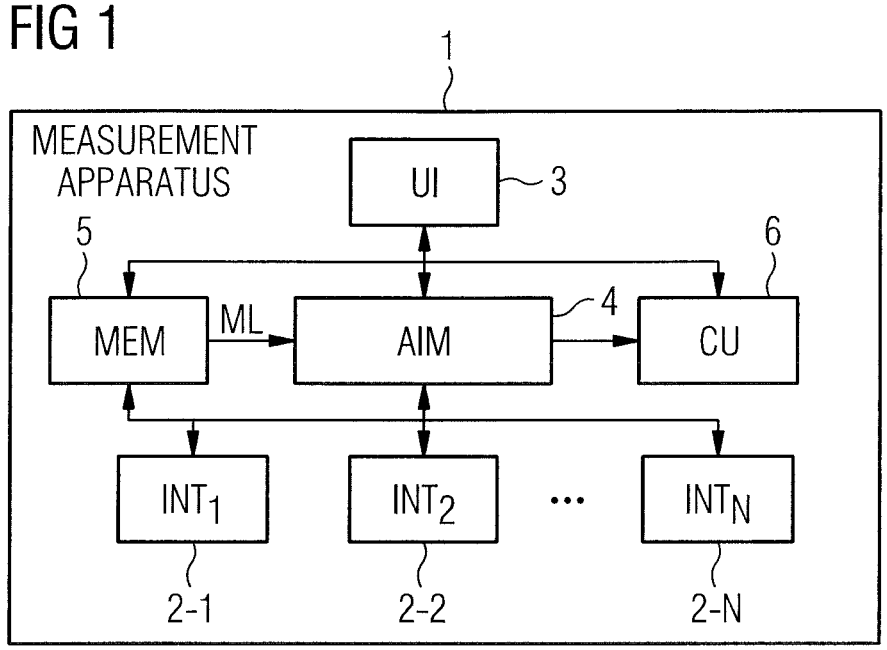
FIG. 1 shows a block diagram of a possible exemplary embodiment of a measurement apparatus according to the first aspect of the present invention.

As can be seen from the block diagram of FIG. 1, the measurement apparatus 1 according to the present invention comprises in the illustrated embodiment at least one device interface 2 adapted to connect one or more auxiliary measurement devices and/or devices under test DUT to said measurement apparatus 1.

In the illustrated embodiment, the measurement apparatus 1 comprises device interfaces 2-1, 2-2 . . . 2-n. The number n of the device interfaces 2-i can vary depending on the type of the respective measurement apparatus 1. The device interfaces 2-i can comprise interfaces for auxiliary or peripheral devices and device interfaces 2-c for one or more devices under test 7. The auxiliary measurement device can for instance comprise a localization device adapted to localize the measurement apparatus 1 in the field. The localization device can for instance comprise a GPS receiver providing coordinates of the measurement apparatus 1.

The auxiliary measurement device can further comprise a sensor device adapted to provide sensor data to the measurement apparatus 1. The measurement apparatus 1 as illustrated in FIG. 1 can be a mobile handheld measurement apparatus for performing measurements in the field in an outdoor environment. Alternatively, the measurement apparatus 1 can also comprise a stationary measurement apparatus 1 for performing measurements in an indoor environment.

The measurement apparatus 1 comprises besides the device interfaces 2-i a user interface 3 adapted to input user settings for performing a measurement by said measurement apparatus 1. The user interface 3 can comprise a graphical user interface GUT comprising a screen or display adapted to output measurement results to a user. The user input 3 can also comprise a touchscreen adapted to input current user settings for performing measurements. The user interface 3 can be integrated in the measurement apparatus 1 as illustrated in the embodiment of FIG. 1. Alternatively, the user interface 3 can form an auxiliary measurement device connected via a device interface 2-i to the measurement apparatus 1. The user interface 3 is adapted to input settings by a user wherein the settings are used for performing a measurement by the measurement apparatus 1, for instance in relation to a device under test DUT.

Figure 3:
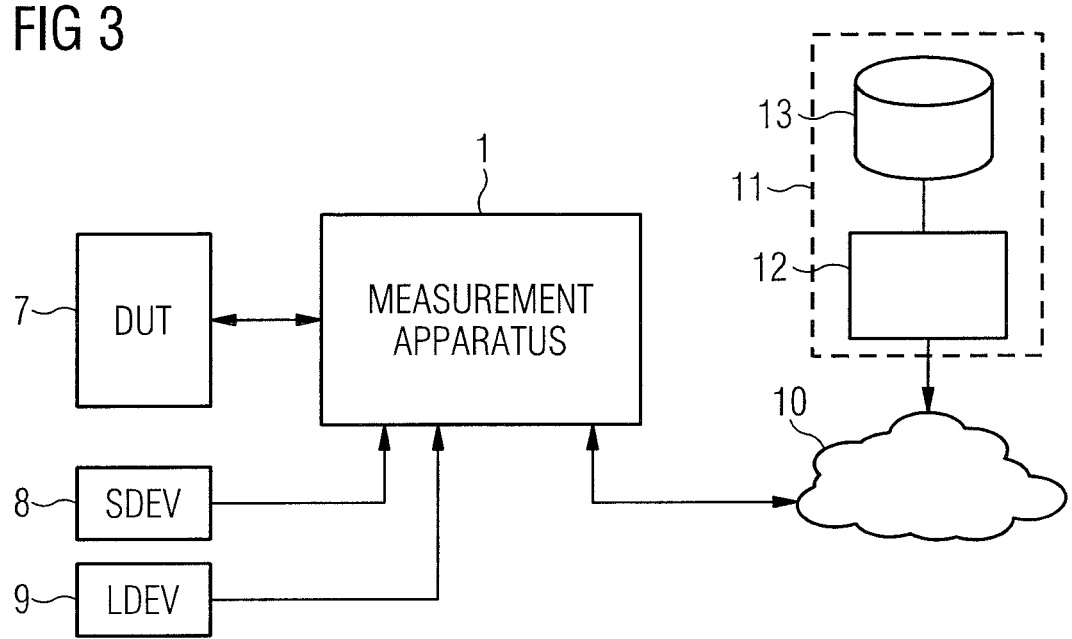
FIG. 3 shows a schematic diagram for illustrating a possible embodiment of a measurement system according to a further aspect of the present invention.

The measurement apparatus 1 comprises an artificial intelligence module 4 adapted to provide current settings of the measurement apparatus 1. The artificial intelligence module 4 is machine learned on the basis of connected devices and/or settings during historic measurements performed by said measurement apparatus 1. In the illustrated embodiment of FIG. 1, the measurement apparatus 1 comprises a local memory 5. The measurement usage history of the measurement apparatus 1 can be recorded in the local memory 5 of the measurement apparatus 1. In an alternative embodiment, the measurement usage history can also be recorded in a remote database 13 to which the measurement apparatus 1 has access as also illustrated in FIG. 3. The measurement usage history including the connected auxiliary measurement devices and/or connected devices under test 7 can be recorded in the local memory 5 of the measurement apparatus 1 and/or in the remote database 13 of the system. In a possible embodiment, the local memory 5 is integrated in the measurement apparatus 1 as shown in FIG. 1. In a possible embodiment, the local memory 5 can also be connected to the measurement apparatus 1 via a device interface 2. The local memory 5 can for instance comprise a data carrier such as a memory stick connectable to the measurement apparatus 1 via a device interface 2. The artificial intelligence module 4 is learned on the basis of the measurement usage history in a machine learning process. In a possible embodiment, the artificial intelligence module 4 can be pretrained in a training phase to get an initial setting and then further machine learned during its operation lifetime using data recorded in the memory 5. In the illustrated embodiment of FIG. 1, the artificial intelligence module 4 provides an output applied to an internal control unit 6 of the measurement apparatus 1 which controls the internal measurement functions of the measurement apparatus 1 in response to the output data provided by the artificial intelligence module 4.

The settings input by a user via the user interface 3 can comprise measurement parameter settings and/or measurement mode settings. The measurement parameter settings are used to adjust measurement parameters related to a current measurement setup. The measurement mode settings comprise different measurement modes and/or operation modes used by the measurement apparatus 1 to perform a measurement. In a possible embodiment, the machine learned artificial intelligence module 4 provides current settings to control measurement functions of the measurement apparatus 1 automatically when the measurement apparatus 1 is switched on or is booted up. In a possible embodiment, the user interface 3 comprises a switch which has a press button which can be used by the user to switch on the measurement apparatus 1. When the measurement apparatus 1 is activated by the user the trained or machine learned artificial intelligence module 4 can provide current settings to control internally measurement functions of the measurement apparatus 1. In a possible embodiment, the machine learned artificial intelligence module 4 is also adapted to prompt the user via the user interface 3 of the measurement apparatus 1 about available software options to perform a current measurement of the measurement apparatus 1. The artificial intelligence module 4 is learned on the basis of the measurement usage history and/or a recorded behavior of an identified user operating the measurement apparatus 1.

The artificial intelligence module 4 may use algorithms to parse data and to learn from said parsed data. The artificial intelligence module 4 then applies what it has learned to make informed decisions. The artificial intelligence module 4 can implement an algorithm to parse the data that was generated when a technician or user was previously using the same measurement apparatus 1. The artificial intelligence module 4 can learn frequently used settings, frequently used modes, and/or frequently pressed user interface elements such as pressed buttons, etc. The artificial intelligence module 4 can recommend from the machine learning process to the user, for instance which page to open once the apparatus 1 is booted up or once a specific button or user interface element has been pressed by the user. For instance, if a user is always using a Smith chart when operating the measurement apparatus 1, the next time the measurement apparatus 1 boots up a machine learning algorithm implemented in the artificial intelligence module 4 will boot up the measurement apparatus 1 in a Smith chart operation mode, since it has learned that this was the mode frequently used by that technician. Other settings may remain set at default. While machine learning can be used to provide algorithms that parse, learn and apply what they had learned, deep learning can be used to structure these algorithms in layers to create an artificial neural network. The artificial intelligence module 4 comprises in a preferred embodiment at least one artificial neural network that can learn and make intelligent decisions on its own. In this embodiment, the deep learning artificial neural network does not just recommend a correct page once the measurement apparatus 1 boots up or once a specific button has been pressed but it can instead fill up the settings with values that it determines as being correct in the given situation. By using a deep learned artificial intelligence module 4, for example a user having used always a Smith chart when operating the measurement apparatus 1 the next time the same measurement apparatus 1 is booted up, the deep learning algorithm executed by the artificial intelligence module 4 of the measurement apparatus 1 does boot up the measurement apparatus 1 in a Smith chart mode since it has been learned that this was the frequently used mode by the user. Further, the artificial intelligence module 4 will also set the most used settings just as points, start and stop frequency, markers, etc., i.e. filling up the current settings with values that the artificial intelligence module 4 determines as being correct in the given measurement setup. The artificial intelligence module 4 can also prompt the user about available software options that the user may find useful when doing certain measurements. The artificial intelligence module 4 can adapt dynamically to a user's behaviour by profiling its usage and predicting what settings will be used the next time the measurement apparatus 1 is powered up. In this way, routine work of inputting settings into the measurement apparatus 1 can be avoided and the required measurement time can be reduced.

Figure 2:
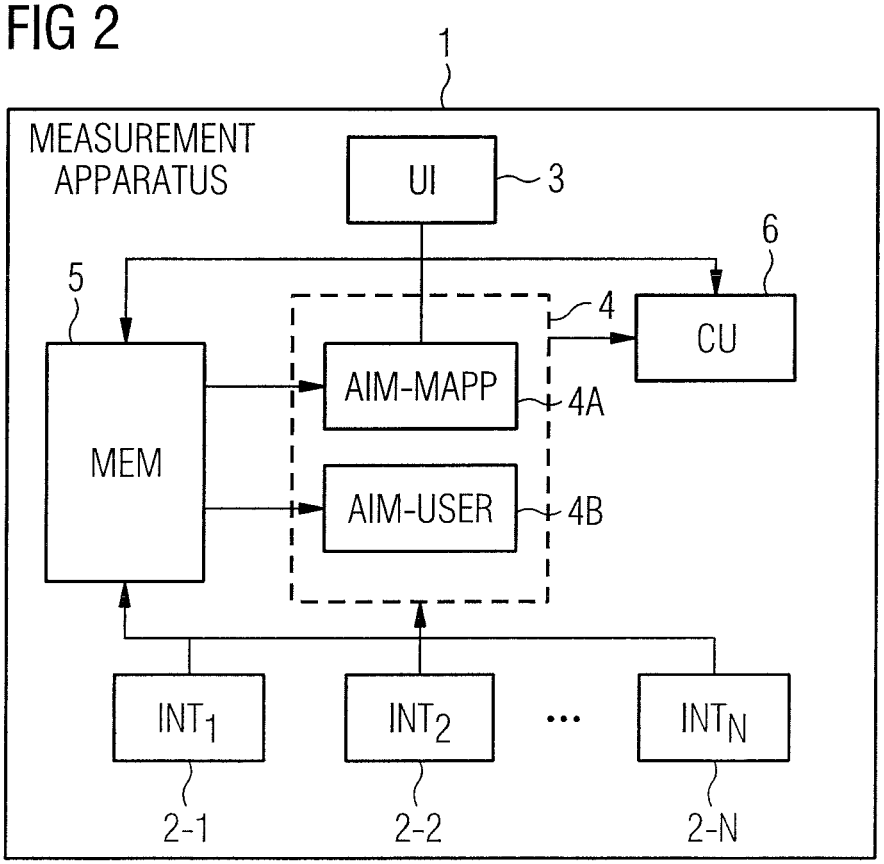
FIG. 2 shows a block diagram of a further possible exemplary embodiment of a measurement apparatus according to the first aspect of the present invention.

FIG. 2 shows a further possible exemplary embodiment of a measurement apparatus 1 according to the first aspect of the present invention. The measurement apparatus 1, in particular a measurement apparatus which is assigned to a specific user performing measurements in the field, can be trained not only on the measurement usage history of the measurement apparatus but also on the recorded measurement behavior of the respective user. Users such as technicians show a user-specific behavior when inputting settings into the measurement apparatus 1. In a possible embodiment, the measurement apparatus 1 comprises a user identification module adapted to identify a user on the basis of the measurement usage history and/or on the basis of a user identification input into the user interface 3. Further, the measurement apparatus 1 may comprise biometric user identification means to identify the current user of the measurement apparatus 1 (e.g. finger print sensor or voice recognition). In the illustrated embodiment of FIG. 2, the artificial intelligence module 4 can comprise a first trained artificial neural network 4A and a second trained artificial neural network 4B. The first artificial neural network 4A is trained on a measurement usage history of user settings irrespective of what kind of users have used the measurement apparatus 1. The second artificial neural network 4B can be trained on a recorded behavior of the specific identified user currently operating the measurement apparatus 1. The output of the two trained artificial neural networks 4A, 4B can be combined (e.g. concatenated) in a possible embodiment to provide a result applied to the internal control unit 6 of the measurement apparatus 1 triggering matching measurement settings of the measurement apparatus 1. In the illustrated embodiment of FIG. 2, current measurement settings are adjusted according to the learned usage profile of the identified user. The artificial intelligence module 4 can predict what kind of operation mode and/or parameter settings a user requires when using the measurement apparatus 1. The measurement apparatus 1 can also suggest available software options that can be loaded by the user as to help him in performing data analysis. Each artificial neural network 4A, 4B can comprise an input layer IL, several hidden layers HL and an output layer OL providing an output feature vector applied to the internal control unit 6 which performs internal control functions to execute measurements in response to the received feature vector.

FIG. 3 shows a schematic diagram for illustrating a possible exemplary embodiment of a measurement system according to the present invention. In the illustrated embodiment, the measurement apparatus 1 is connected via a device interface 2 to a device under test DUT 7. The device under test 7 can comprise for instance a printed current board PCB of a machine to be tested. Further, several devices under test 7 can be connected to the measurement apparatus 1 in parallel. In the illustrated example, a sensor device 8 can be connected to another device interface 2-$i$ of the measurement apparatus 1. The sensor device 8 can for instance comprise a current probe used to measure an electrical current I flowing within the device under test 7. A plurality of different kinds of sensor devices 8 can be connected to the measurement apparatus 1 such as voltage sensors, temperature sensors etc. In the illustrated example of FIG. 3, a localization device 9 such as a GPS receiver can be connected to the measurement apparatus 1 as well. The localization device 9 can provide localization data indicating a current position of the apparatus 1 in the field. In the illustrated setup of FIG. 3, the measurement apparatus 1 is connected via a further device interface 2 to a data network 10 such as the Internet. A backend platform 11 can comprise a web server 12 having access to a database 13. In a possible embodiment, the measurement usage history of the measurement apparatus 1 can be recorded in the remote database 13 of the system illustrated in FIG. 3. The measurement usage history of the measurement apparatus 1 can be used to train the artificial intelligence module 4 of the measurement apparatus 1 in the background continuously. The system shown in FIG. 3 can be used to generate automatically user setting configurations for the measurement apparatus 1. The measurement apparatus 1 can comprise a processing unit where the artificial intelligence module 4 is implemented. The processing unit is able to adjust user settings and user configurations based on information about connected sensor and/or auxiliary measurement devices and/or measured devices under test data in combination with information of the measurement apparatus usage history. The user settings can be saved or memorized after each measurement process.

Figure 4:
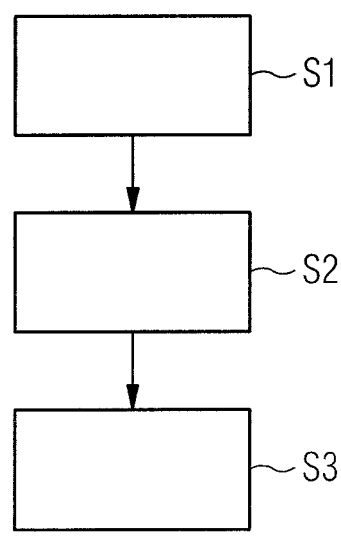
FIG. 4 shows a flowchart of a possible exemplary embodiment of a method according to a further aspect of the present invention.

FIG. 4 shows a flowchart of a possible exemplary embodiment of a method for performing a configuration of a measurement apparatus 1 such as the measurement apparatus 1 illustrated in FIGS. 1 to 3.

In a first step S1, a measurement usage history of the respective measurement apparatus 1 can be recorded. The measurement usage history can be recorded in a local memory 5 of the respective measurement apparatus 1 and/or in a remote database 13 of a backend platform 11. The measurement usage history can be stored in a memory area of the database 13 associated with a unique measurement apparatus identifier of the measurement apparatus 1.

The artificial intelligence module 4 of the measurement apparatus 1 is machine learned in a further step S2 on the basis of the stored measurement usage history of the measurement apparatus 1. The machine learning process can be performed in an initial training phase to provide an initial setting of the measurement apparatus 1. Further, the machine learning can be performed during the operation of the measurement apparatus 1 continuously in the background to improve the performance of the artificial intelligence module 4. The machine learning can be performed in a supervised or unsupervised manner.

In a further step S3, the settings of the measurement apparatus 1 are generated automatically by the machine learned artificial intelligence module 4 when the measurement apparatus 1 is activated.

Figure 5:
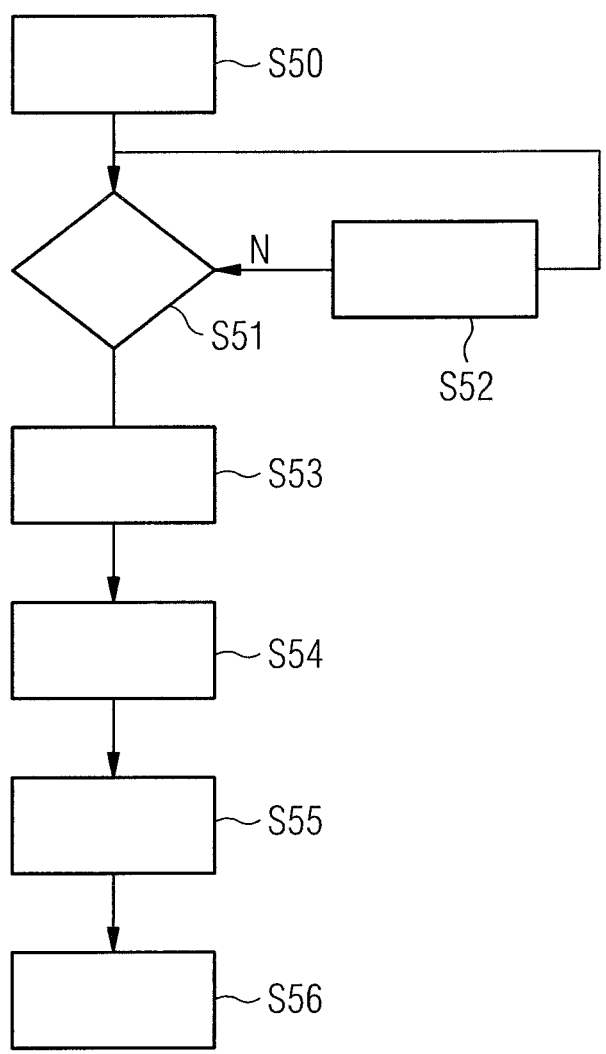
FIG. 5 shows a further flowchart for illustrating a possible exemplary embodiment of a method according to the present invention.

FIG. 5 shows a flowchart of a further possible embodiment of the method according to the present invention. The process is initiated in step S50. In a first step S51, it is checked whether enough historic data has been collected for the respective measurement apparatus 1. Accordingly, it is checked whether the measurement usage history of the measurement apparatus 1 identified by the measurement apparatus identifier comprises enough data to train the artificial intelligence module 4 in such a way that it provides a sufficient performance. If not enough measurement usage history data is available, a process is triggered in step S52 to get more measurement usage history data, e.g. from the remote database 13. If enough measurement usage history data is available, it can be checked in a further step S53, whether peripheral devices have been connected to the apparatus 1. Further, it can be identified in step S54, which applications have been used most by the user to perform measurements in the past. In a further step S55, it can be inquired what kind of device under test 7 has been connected to the measurement apparatus 1. In a step S56, the artificial intelligence module 4 can provide automatically current settings of the measurement apparatus 1 on the basis of the connected devices, i.e. connected peripheral devices and/or devices under test 7 and/or other settings during historic measurements performed by the same measurement apparatus 1. It can further launch required user applications for the current measurement.

Figure 6:
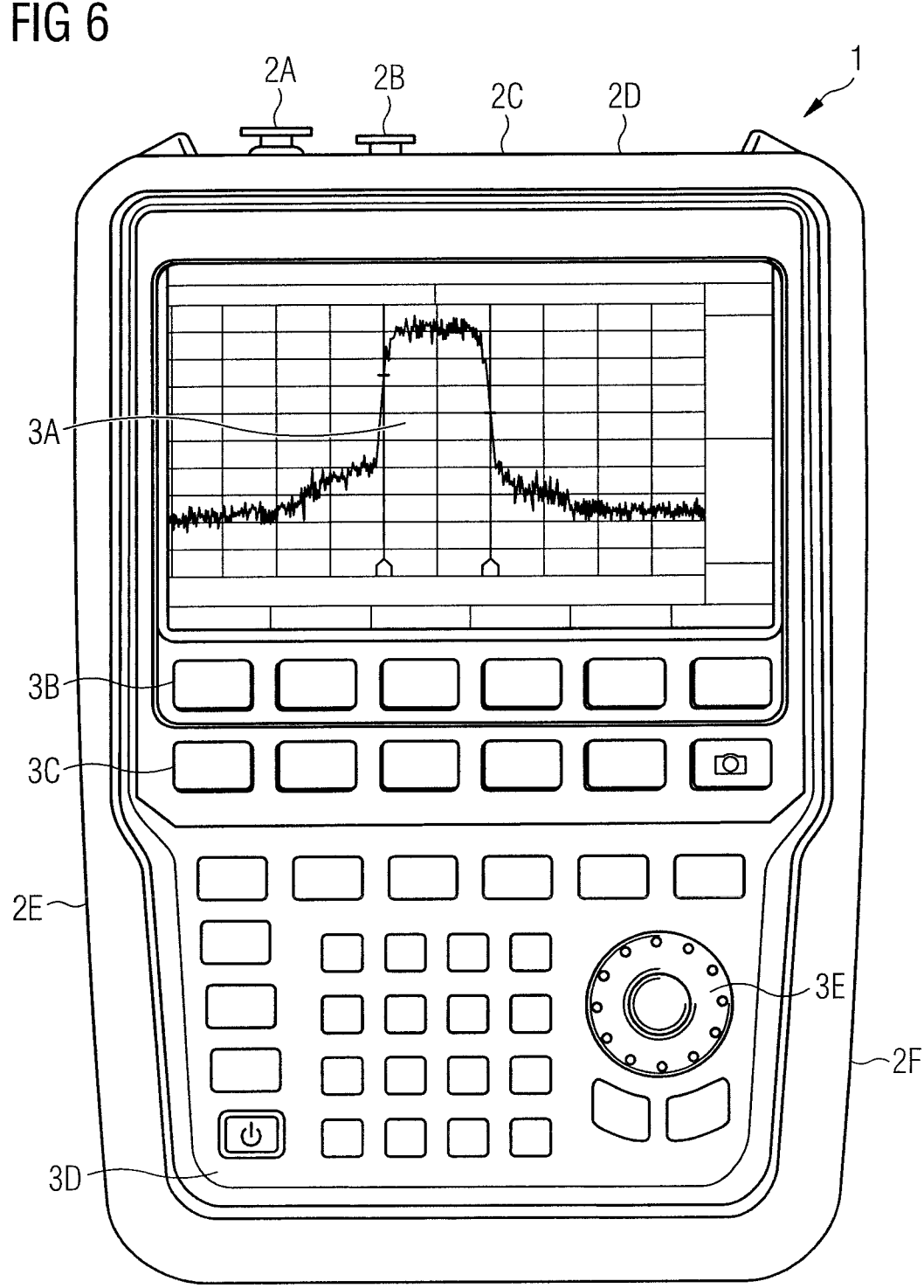
FIG. 6 shows an exemplary embodiment of a measurement apparatus according to the present invention.

FIG. 6 shows a front view on the measurement apparatus 1 with a front panel user interface 3. In the illustrated example, the measurement apparatus 1 is a handheld spectrum analyzer having a touch-sensitive display area 3A which can be used to show a spectrum to a user. The user interface 3 further comprises in the illustrated example soft keys 3B as well as system keys 3C. Further, the user interface 3 can comprise a key pad 3D with function keys and a rotary knob 3E with ENTER function. The key pad 3D can include an alphanumeric key pad and a power key to switch on the measurement apparatus 1. The measurement apparatus 1 further comprises a housing with a plurality of different kinds of device interfaces such as an RF input 2A, a BNC connector 2B, a platform interface 2C and USB ports 2D on top of the housing of the measurement apparatus 1. Further, the measurement apparatus 1 can comprise a DC connector 2E. Other device interfaces 2F include an interface for a local area network LAN and one or more several USB ports 2F. The handheld spectrum analyzer 1 illustrated in FIG. 6 comprises a processing unit with an implemented artificial intelligence module 4 adapted to provide current settings of the spectrum analyzer 1. The artificial intelligence module 4 of the spectrum analyzer 1 illustrated in FIG. 6 is machine learned on the basis of connected devices and/or settings input by a user during historic measurements performed by the measurement analyzer apparatus 1. The measurement results can be saved automatically as soon as the measurement has been completed. The measurement results or measurement data and/or the associated measurement settings can be transferred to a tablet or PC and can also be stored in the remote database 13 of the system. The measurement time is reduced thanks to the automatic instrument setting performed by the trained artificial intelligence module 4 of the measurement apparatus 1. As soon as a user presses the power key of the key pad 3D of the user interface 3, the measurement apparatus 1 is switched on and the trained machine learned artificial intelligence module 4 provides an output applied to the internal control unit 6 to provide current settings to control measurement functions of the measurement apparatus 1. Further, the artificial intelligence module 4 may launch required user applications.

The invention claimed is:

1. A measurement apparatus adapted to perform measurements in relation to at least one device under test, DUT, in test sequences using measurement settings, said apparatus comprising:
   at least one device under test interface to which the device under test, DUT, is connected, and
   at least one auxiliary measurement device interface to which an auxiliary measurement device is connected to provide sensor data and/or localization data to said measurement apparatus;
   a user interface adapted to input by a user settings for performing a measurement by said measurement apparatus in relation to the connected device under test, DUT, and
   an artificial intelligence, AI, module adapted to provide current settings of said measurement apparatus, wherein said artificial intelligence, AI, module is machine learned on the basis of connected devices and/or settings during historic measurements performed by said measurement apparatus, wherein the trained machine learned artificial intelligence module provides an output applied to an internal control unit to provide the current settings to control measurement functions of said measurement apparatus.

2. The measurement apparatus according to claim 1 wherein a measurement usage history including connected devices and settings of measurements performed by said measurement apparatus in relation to a device under test, DUT, is recorded over time in a memory.

3. The measurement apparatus according to claim 2 wherein the measurement usage history of said measurement apparatus is recorded in a local memory of said measurement apparatus and/or in a remote database.

4. The measurement apparatus according to claim 1 wherein the settings input by the user via said user interface comprise measurement parameter settings and/or measurement mode settings.

5. The measurement apparatus according to claim 1 wherein the machine learned artificial intelligence, AI, module comprises an artificial neural network.

6. The measurement apparatus according to claim 1 wherein the auxiliary measurement device comprises a localization device adapted to provide localization data to said measurement apparatus, wherein the localization data indicates a current position of the measurement apparatus the field, or comprises a sensor device adapted to provide sensor data to said measurement apparatus.

7. The measurement apparatus according to claim 1 wherein the machine learned artificial intelligence, AI, module provides the current settings to control measurement functions of said measurement apparatus automatically when the measurement apparatus is switched on or is booted up.

8. The measurement apparatus according to claim 1 wherein the machine learned artificial intelligence, AI, module is adapted to prompt the user via the user interface of said measurement apparatus about available software options to perform the current measurement by said measurement apparatus.

9. The measurement apparatus according to claim 1 wherein the artificial intelligence, AI, module is machine learned on the basis of its recorded measurement usage history in a separate machine learning process.

10. The measurement apparatus according to claim 1 further comprising a user identification module adapted to identify a user on the basis of the measurement usage history and/or on the basis of a user identification input into the user interface of said measurement apparatus or by biometric user identification means.

11. The measurement apparatus according to claim 1 wherein the artificial intelligence, AI, module comprises a first artificial network trained on the basis of the measurement usage history and a second artificial network trained on a recorded behavior of a user identified by an identification module of said measurement apparatus, wherein an output of the two trained artificial neural networks is combined to provide a result applied to an internal control unit of said measurement apparatus triggering matching measurement settings of the measurement apparatus.

12. The measurement apparatus according to claim 1 wherein the measurement apparatus comprises a mobile handheld measurement apparatus for performing measurements in the field in an outdoor environment or a stationary measurement apparatus for performing measurements in an indoor environment.

13. A measurement system comprising:
at least one measurement apparatus adapted to perform measurements in relation to at least one device under test, DUT, in test sequences using measurement settings, said measurement apparatus having at least one device under test interface to which the device under test, DUT, is connected and at least one auxiliary measurement device interface to which an auxiliary measurement device is connected to provide sensor data and/or localization data to said measurement apparatus,
a user interface adapted to input by a user settings for performing a measurement by said measurement apparatus in relation to the device under test, DUT, and
an artificial intelligence, AI, module adapted to provide current settings of said measurement apparatus, wherein said artificial intelligence, AI, module of said measurement apparatus is machine learned on the basis of connected devices and/or settings during historic measurements performed by said measurement apparatus,
wherein said measurement system further comprises a database adapted to store the measurement usage history of the measurement apparatus.

14. A method for performing a configuration of a measurement apparatus adapted to perform measurements in relation to at least one device under test, DUT, in test sequences using measurement settings, said measurement apparatus having at least one device under test interface to which the device under test, DUT, is connected and at least one auxiliary measurement device interface to which auxiliary measurement device is connected to provide sensor data and/or localization data to said measurement apparatus, the method comprising the steps of:
recording a measurement usage history of said measurement apparatus, wherein the measurement usage history includes devices connected to said measurement apparatus and/or settings of measurements performed b said measurement apparatus during historic measurements;
machine learning an artificial intelligence, AI, module of said measurement apparatus on the basis of the measurement usage history of said measurement apparatus; and
generating automatically the settings of said measurement apparatus by said machine learned artificial intelligence, AI, module when the measurement apparatus is activated.

15. The method according to claim 14 wherein the measurement usage history is recorded in a local memory of said measurement apparatus and/or in a remote database.

16. The measurement system according to claim 13 wherein the device under test, DUT, comprises a printed circuit board of a machine under test.

* * * * *